F. Beals,
Snap Hook,
No 57,847. Patented Sep. 11, 1866.
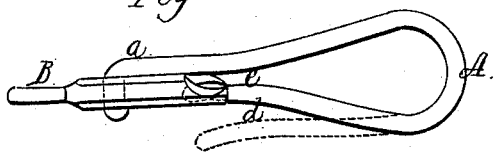
Fig. 1.
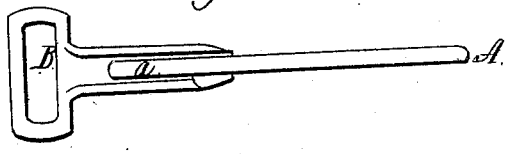
Fig. 2.
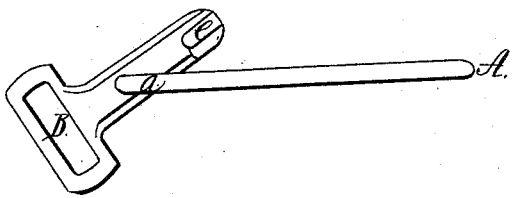
Fig. 3.
Fig. 4.
Witnesses: John H. Shumway, Altsie J. Tibbits.
Inventor: Fadger Beals

UNITED STATES PATENT OFFICE.

FORDYCE BEALS, OF NEW HAVEN, CONNECTICUT.

IMPROVED SNAP-HOOK.

Specification forming part of Letters Patent No. 57,847, dated September 11, 1866

*To all whom it may concern:*

Be it known that I, FORDYCE BEALS, of New Haven, in the county of New Haven and State of Connecticut, have invented a new Improvement in Snap-Hooks; and I do hereby declare the following, when taken in connection with the accompanying drawings and the letters of reference marked thereon, to be a full, clear, and exact description of the same, and which said drawings constitute part of this specification, and represent, in—

Figure 1, a side view, the hook clasped; Fig. 2, a top view of the same; and in Fig. 3 a top view of the hook unclasped.

My invention relates to an improvement in snap-hooks, such as are used for reins and other like purposes; and it consists in forming the hook entire from a single piece of steel or other elastic material, and pivoting one end of the hook to the eye, the said eye being constructed so as to receive and secure the other end of the hook; and to enable others skilled in the art to construct and use my invention, I will proceed to describe the same, as illustrated in the accompanying drawings.

A is the hook, formed from steel wire or other similar elastic material, its one end, $a$, pivoted to the shank of the eye B, as seen in Fig. 1, so that the said hook may be turned to one side, as seen in Fig. 3. The other end, $d$, of the hook A locks into a recess or notch, $e$, in the shank of the eye B. (See Figs. 1 and 3.)

The elasticity of the hook should be such that when locked, as in Fig. 1, the end $d$ of the hook A will set firmly into the notch $e$; then, by pressing the end $d$ up from the notch $e$, the hook may be freely turned to the position denoted in Fig. 3, in which position and free the end $d$ opens, as denoted in red, Fig. 1. The hook is then in position for being attached to whatsoever is required, and when so attached press the end $d$, turn the hook back to the position denoted in Fig. 2, when it again falls into the notch $e$ and secures the hook; or an incline, $f$, may be formed on the shank, as seen in Fig. 4, so that the end $d$ may be easily pressed into the notch $e$ without being depressed, as before mentioned, in some classes of hooks. This would doubtless be the better plan.

This construction is extremely cheap, as the eye, with its shank, may be cast metal, and the hook formed from steel wire, the two parts attached together without the intervention of the small spring used in various ways, and the numerous rivets thereby required, and thus constructed is more durable, convenient, and secure than ordinary snap-hooks.

Having therefore thus fully described my invention, what I claim as new and useful, and desire to secure by Letters Patent, is—

The hook A, pivoted to the shank of the eye B, and arranged so as to operate substantially in the manner and for the purpose herein set forth.

FORDYCE BEALS.

Witnesses:
JOHN E. EARLE,
ALTSIE TIBBITS.